No. 634,557.　　　　　　　　　　　　　　　　　Patented Oct. 10, 1899.
C. HALSTEAD.
CULINARY VESSEL.
(Application filed Feb. 24, 1899.)
(No Model.)　　　　　　　　　　　　　　　　　2 Sheets—Sheet 1.
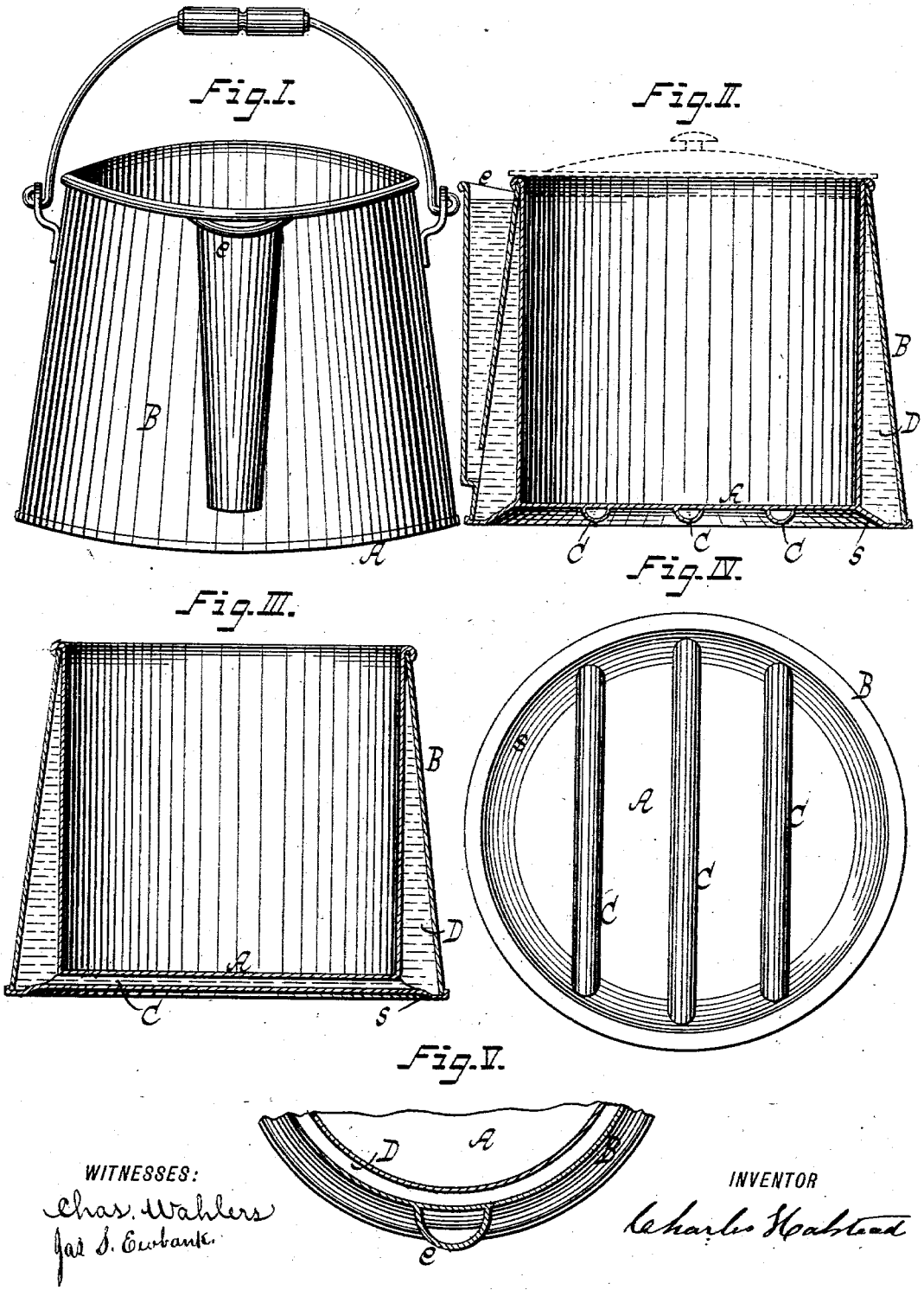
WITNESSES:　　　　　　　　　　　　　　　INVENTOR
Chas. Wahlers　　　　　　　　　　　　　Charles Halstead
Jas S. Ewbank.

No. 634,557. Patented Oct. 10, 1899.
C. HALSTEAD.
CULINARY VESSEL.
(Application filed Feb. 24, 1899.)
(No Model.) 2 Sheets—Sheet 2.
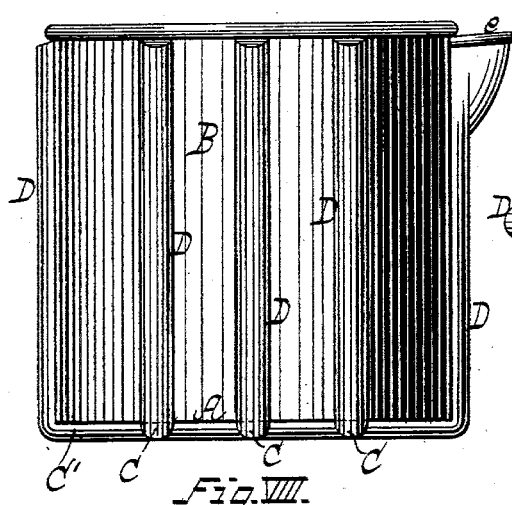
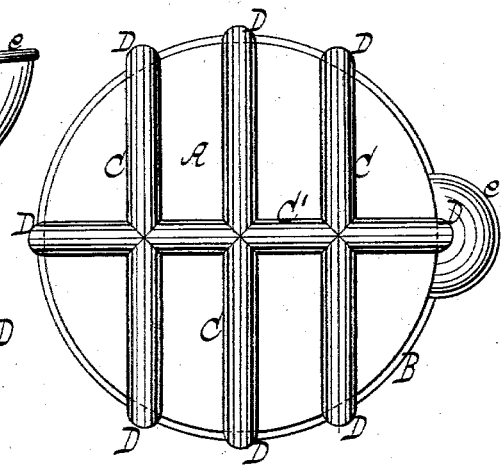
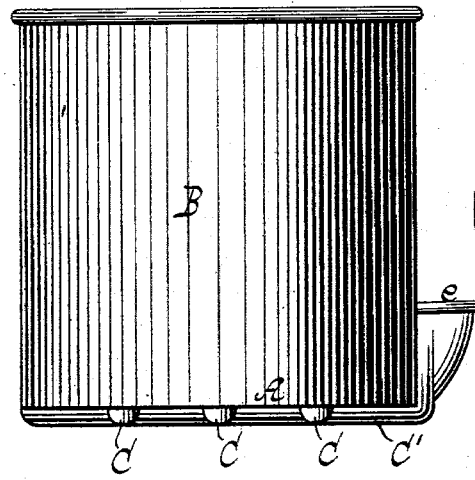
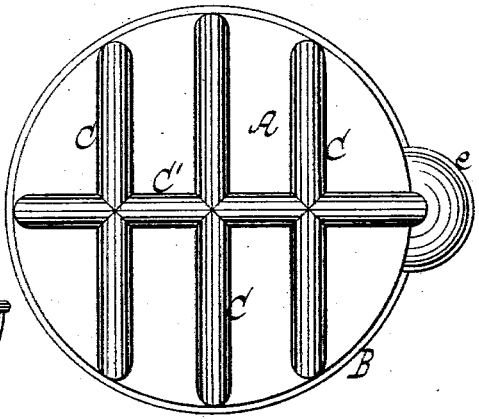
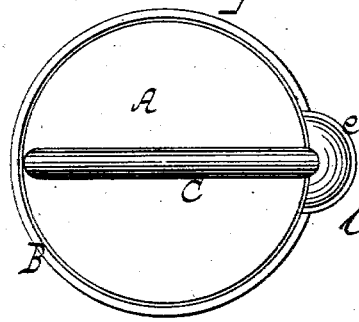
WITNESSES:
Chas. Wahlers
Jas. S. Ewbank
INVENTOR
Charles Halstead

UNITED STATES PATENT OFFICE.

CHARLES HALSTEAD, OF NEW YORK, N. Y.

CULINARY VESSEL.

SPECIFICATION forming part of Letters Patent No. 634,557, dated October 10, 1899.

Application filed February 24, 1899. Serial No. 706,751. (No model.)

*To all whom it may concern:*

Be it known that I, CHARLES HALSTEAD, a citizen of the United States, and a resident of New York, (Brooklyn,) in the county of Kings and State of New York, have invented certain new and useful Improvements in Culinary Vessels, of which the following is a specification.

The object of my invention is to maintain a low and uniform temperature of the bottom and side, either or both, of a culinary vessel by the employment of a cooling medium and at the same time cause a direct action of heat through said bottom on the material in the vessel, thereby permitting effective cooking of the material without danger of scorching or burning it. This object I have accomplished by providing the bottom of the culinary vessel with one or more hollow sections alternating with solid portions thereof to receive a cooling medium, and also usually providing the side of the vessel with one or more like sections communicating with the hollow section or sections of the bottom, as hereinafter more fully described with reference to the accompanying drawings, in which—

Figure 1 represents a perspective view of a culinary vessel embodying my invention. Fig. 2 represents a vertical central section thereof. Fig. 3 represents a like section thereof taken at right angles to Fig. 2. Fig. 4 represents a bottom view thereof. Fig. 5 represents a horizontal section of a portion thereof, said vessel in each of these figures having a continuous hollow side section. Figs. 6 and 7 represent, respectively, a side view and bottom view of the vessel with independent hollow side sections and bottom sections. Figs. 8 and 9 represent like views of the vessel with hollow bottom sections only. Fig. 10 represents a bottom view of the vessel with a single hollow bottom section to indicate a rim forming a constituent part of the vessel and serving to bring the hollow bottom section above the base-line thereof.

Similar letters indicate similar parts.

The letter A indicates the bottom, and B the side, of the vessel, which may be of any usual or suitable shape, including a suitable handle or cover, and formed of any suitable material.

C indicates a hollow section or sections of the bottom, and D a hollow section or sections of the side of the vessel.

Referring to Figs. 1 to 5, inclusive, the side B of the vessel has a double wall forming a single hollow side section B, which is continuous as to said side, and the bottom has a series of independent and parallel hollow sections C, which communicate with said side section at the ends, as more clearly shown in Fig. 3, the side section being provided with a mouth *e*, through which it may be supplied with water or other suitable cooling medium, whence the water flows into and through each of said bottom sections.

Referring to Figs. 6 and 7, the side B of the vessel has a series of independent and parallel hollow sections D, which communicate, respectively, with one of the bottom sections C and one of which is provided with a mouth *e* for supplying it and thence the remaining sections with water. In said figures, moreover, the parallel hollow bottom sections C are connected together by a hollow cross-section C', forming practically a continuous hollow bottom section, which, however, is of a less area than the bottom A of the vessel.

Referring to Figs. 8 and 9, the hollow bottom sections C are arranged as in Figs. 6 and 7, including the hollow cross-section C', and one of said bottom sections is provided with a mouth *e* for supplying the series of sections with water, the hollow side sections of the vessel shown in the preceding figures being omitted.

Referring to Fig. 10, the bottom A of the vessel has a single hollow section C with a mouth *e* at one end.

In order to bring the hollow bottom sections C above the lower edge of the vessel, the bottom A may be raised, as at S, Figs. 2, 3, and 4, and for convenience of manufacture the outer members of the double wall shown in said figures may be tapered in an upward direction and united to the inner member of said wall at the top of the vessel.

It will be observed that in each of the examples shown in the drawings the hollow bottom sections C are of less area than the solid sections A and alternate with solid portions of the bottom, and hence when the vessel is placed on a stove the heat of the stove-fire is caused to act directly on the material in the vessel through said bottom—namely, between its hollow sections—while if a cooling medium be supplied to the hollow sections C D the heat of the solid sections is controlled and kept below the burning-point and of greater degree than the cooling medium. The parts of the vessel are thereby kept at a comparatively low temperature, so that while the material in the vessel is exposed to the direct action of the heat for rapidly and thoroughly cooking it the danger of scorching or burning the material is obviated, due to the fact that by said cooling medium in the hollow section or sections the temperature of the vessel is kept below a burning-point not only as to said hollow sections, but also as to the solid portions of the vessel, irrespective of the degree of heat to which the vessel may be exposed.

In defining my invention more fully I would remark that the hollow section or sections C form a component part of the bottom or side, as the case may be, of the vessel and alternate with the solid portion thereof at as great a distance apart as the cooling medium, when applied to the hollow sections, will act upon and keep the solid portion below the burning-point, irrespective of a cooling medium in the interior of the vessel.

What I claim as new, and desire to secure by Letters Patent, is—

1. A culinary vessel having its bottom provided as a component part with a hollow section or sections alternating with the solid sections or portion thereof, to receive a cooling medium, and having an open mouth connected to the vessel to communicate with said hollow section or sections and constituting a source of supply of the cooling medium thereto, whereby a circulation is afforded to the cooling medium through the hollow section or sections, and said bottom is kept at a temperature below the burning-point, substantially as and for the purpose described.

2. A culinary vessel having both its bottom and side provided with hollow sections communicating with each other, to receive a cooling medium, substantially as and for the purpose described.

3. A culinary vessel having a double wall forming a hollow side section, combined with a bottom with solid sections alternating with a hollow section or sections communicating with said side section, substantially as and for the purpose described.

4. A culinary vessel having a side wall provided with hollow sections alternating with the solid sections or portion thereof, and having an open mouth communicating with the hollow sections for supply a cooling medium thereto, substantially as and for the purpose described.

In testimony that I claim the foregoing as my invention I have signed my name, in presence of two witnesses, this 15th day of February, 1899.

CHARLES HALSTEAD.

Witnesses:
CHAS. WAHLERS,
EDWD. D. B. KISSAM.